US012579623B2

(12) United States Patent
Wang

(10) Patent No.: US 12,579,623 B2
(45) Date of Patent: Mar. 17, 2026

(54) IMAGE PROCESSING METHOD AND APPARATUS, ELECTRONIC DEVICE, AND READABLE STORAGE MEDIUM

(71) Applicant: Beijing Zitiao Network Technology Co., Ltd., Haidian District (CN)

(72) Inventor: Guangwei Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 46 days.

(21) Appl. No.: 18/551,392

(22) PCT Filed: Mar. 29, 2022

(86) PCT No.: PCT/CN2022/083822
§ 371 (c)(1),
(2) Date: Sep. 19, 2023

(87) PCT Pub. No.: WO2022/227996
PCT Pub. Date: Nov. 3, 2022

(65) Prior Publication Data
US 2024/0177409 A1 May 30, 2024

(30) Foreign Application Priority Data

Apr. 28, 2021 (CN) .......................... 202110468921.0

(51) Int. Cl.
*G06T 5/90* (2024.01)
*G06T 7/11* (2017.01)
*G06T 15/50* (2011.01)
(52) U.S. Cl.
CPC .................. *G06T 5/90* (2024.01); *G06T 7/11* (2017.01); *G06T 15/506* (2013.01); *G06T 2207/10028* (2013.01)

(58) Field of Classification Search
CPC .......... G06N 3/08; G06N 3/04; G06T 15/506; G06T 2207/10028; G06T 5/90;
(Continued)

(56) References Cited

U.S. PATENT DOCUMENTS 9,905,045 B1 2/2018 Hery et al.
2015/0043806 A1 2/2015 Karsch et al.
(Continued)

FOREIGN PATENT DOCUMENTS

CN 101872491 A 10/2010
CN 101917637 A 12/2010
(Continued)

OTHER PUBLICATIONS

China National Intellectual Property Administration, International Search Report and Written Opinion Issued in Application No. PCT/CN2022/083822, Jun. 13, 2022, WIPO, 12 pages.
(Continued)

*Primary Examiner* — Ming Wu
(74) *Attorney, Agent, or Firm* — Alleman Hall LLP

(57) ABSTRACT

Embodiments of the present disclosure provide an image processing method and apparatus, an electronic device, and a readable storage medium. The method includes: acquiring a to-be-processed image, where the to-be-processed image includes a target object; acquiring, by adopting a feature model, normal feature information and target feature information of the target object, where the target feature information includes: depth feature information and/or tangent feature information; performing, based on the normal feature information and the target feature information, a lighting rendering on the target object in the to-be-processed image to obtain a lighting-rendered-image; and outputting the lighting-rendered-image. Compared with the prior art, in the present disclosure, a terminal device may perform the
(Continued)

lighting rendering on the target object based on richer feature information of the target object, which can enrich a lighting rendering effect.

20 Claims, 6 Drawing Sheets

(58) Field of Classification Search
CPC . G06T 7/11; G06T 15/50; G06T 2207/10004; G06T 2207/30201; G06V 10/46; G06V 10/56; G06V 10/82
See application file for complete search history.

(56) References Cited

U.S. PATENT DOCUMENTS

| | | | | |
|---|---|---|---|---|
| 2015/0098644 | A1* | 4/2015 | Atif | G06T 5/00 |
| | | | | 382/154 |
| 2020/0211716 | A1* | 7/2020 | Lefkofsky | G06F 18/214 |
| 2020/0242335 | A1* | 7/2020 | Eshima | G06V 40/166 |
| 2020/0327690 | A1* | 10/2020 | Cai | G06T 7/73 |
| 2020/0364518 | A1* | 11/2020 | Xu | G06N 3/08 |
| 2020/0374526 | A1* | 11/2020 | Zhou | H04N 19/149 |
| 2020/0408658 | A1* | 12/2020 | Nasu | G01N 21/25 |

FOREIGN PATENT DOCUMENTS

| | | | |
|---|---|---|---|
| CN | 107909640 | A | 4/2018 |
| CN | 110298910 | A | 10/2019 |
| CN | 110570503 | A | 12/2019 |
| CN | 110853128 | A | 2/2020 |
| CN | 111462269 | A | 7/2020 |
| CN | 111583381 | A | 8/2020 |
| CN | 111815750 | A | 10/2020 |
| CN | 111833430 | A | 10/2020 |
| CN | 112070888 | A | 12/2020 |
| CN | 112258622 | A | 1/2021 |
| JP | 2006268810 | A | 10/2006 |
| JP | 2020197774 | A | 12/2020 |

OTHER PUBLICATIONS

China National Intellectual Property Administration, Office Action and Search Report Issued in Application No. 202110468921.0, Jul. 7, 2025, 19 pages.
China National Intellectual Property Administration, Office Action Issued in Application No. 202110468921.0, Jan. 16, 2026, 24 pages.

* cited by examiner

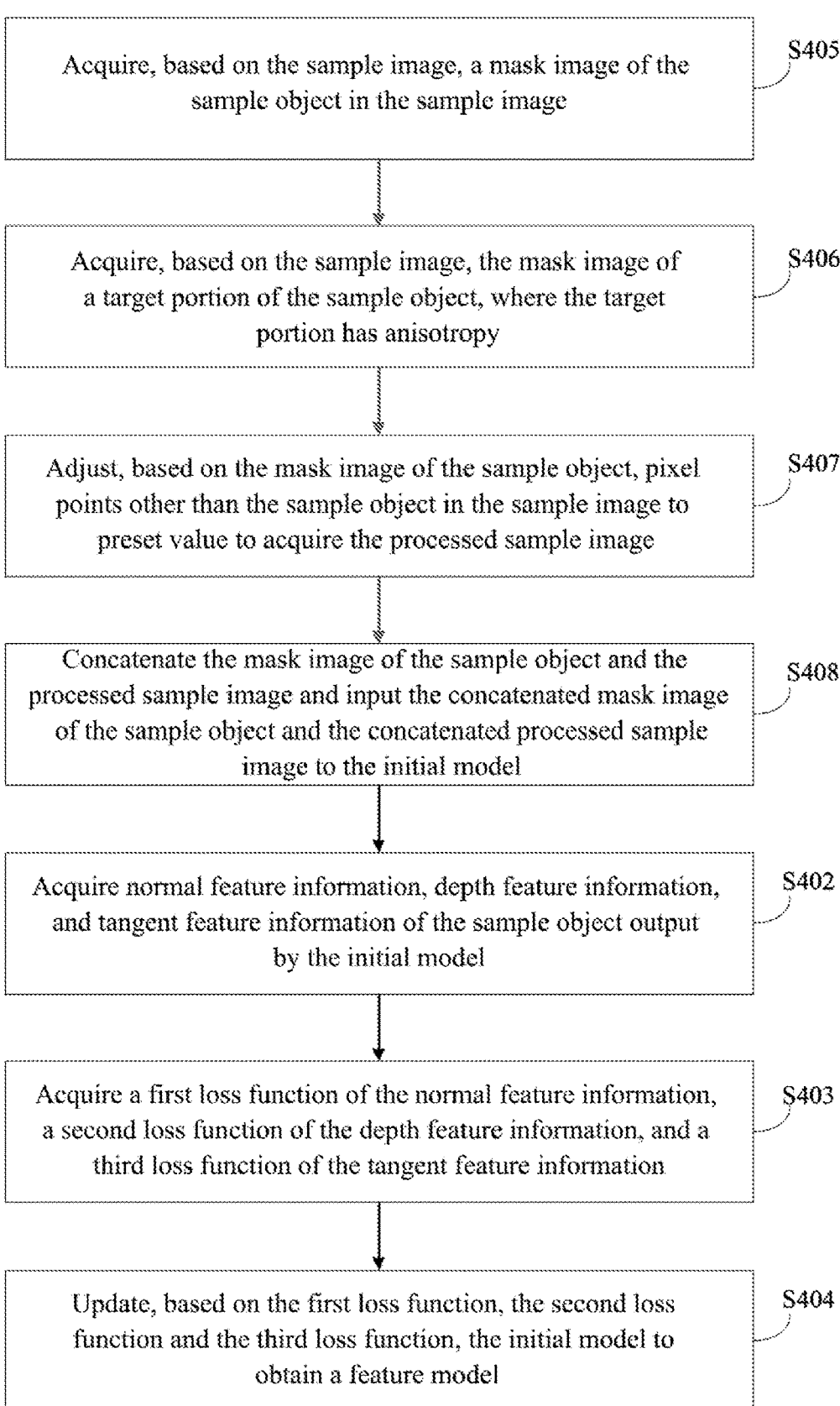

Acquire, based on the sample image, a mask image of the sample object in the sample image    S405

Acquire, based on the sample image, the mask image of a target portion of the sample object, where the target portion has anisotropy    S406

Adjust, based on the mask image of the sample object, pixel points other than the sample object in the sample image to preset value to acquire the processed sample image    S407

Concatenate the mask image of the sample object and the processed sample image and input the concatenated mask image of the sample object and the concatenated processed sample image to the initial model    S408

Acquire normal feature information, depth feature information, and tangent feature information of the sample object output by the initial model    S402

Acquire a first loss function of the normal feature information, a second loss function of the depth feature information, and a third loss function of the tangent feature information    S403

Update, based on the first loss function, the second loss function and the third loss function, the initial model to obtain a feature model    S404

IMAGE PROCESSING METHOD AND APPARATUS, ELECTRONIC DEVICE, AND READABLE STORAGE MEDIUM

CROSS-REFERENCE TO RELATED APPLICATIONS

This application is a national stage of International Application No. PCT/CN2022/083822, filed on Mar. 29, 2022, which claims priority to Chinese Patent Application No. 202110468921.0, filed on Apr. 28, 2021. Both of the aforementioned applications are hereby incorporated by reference in their entireties.

TECHNICAL FIELD

Embodiments of the present disclosure relate to the field of image processing technologies and, in particular, to an image processing method and apparatus, an electronic device, and a readable storage medium.

BACKGROUND

Relighting technology is a technology that changes a lighting when shooting an image to obtain a new image. For example, a face relighting technology targets a face in the image, that is, the relighting is performed on the face. The relighting technology is widely used in post-processing of images or post-production of movies. Exemplarily, a user may process the face in the image by adopting a relighting function in an image retouching software to change a light and shadow effect of the face.

At present, the image processing apparatus may adopt the lighting from a certain angle to perform a lighting rendering on an object based on normal information of the object, and the rendering effect is single.

SUMMARY

Embodiments of the present disclosure provide an image processing method and apparatus, an electronic device, and a readable storage medium, which can enrich the lighting rendering effect of an image.

In a first aspect, an embodiment of the present disclosure provides an image processing method, including: acquiring a to-be-processed image, where the to-be-processed image includes a target object; acquiring, by adopting a feature model, normal feature information and target feature information of the target object, where the target feature information includes: depth feature information and/or tangent feature information; performing, based on the normal feature information and the target feature information, a lighting rendering on the target object in the to-be-processed image to obtain a lighting-rendered-image; and outputting the lighting-rendered-image.

In a second aspect, an embodiment of the present disclosure provides an image processing apparatus, including:

a processing module, configured to acquire a to-be-processed image, where the to-be-processed image includes a target object; acquire, by adopting a feature model, normal feature information and target feature information of the target object, where the target feature information includes: depth feature information and/or tangent feature information; perform, based on the normal feature information and the target feature information, a lighting rendering on the target object in the to-be-processed image to obtain a lighting-rendered-image; and an outputting module, configured to output the lighting-rendered-image.

In a third aspect, an embodiment of the present disclosure provides an electronic device, including: a processor and a memory;

the memory stores computer executable instructions;

the processor executes the computer executable instructions stored in the memory, enabling the processor to execute the image processing method as described in the above first aspect and various possible designs of the above first aspect.

In a fourth aspect, an embodiment of the present disclosure provides a computer readable storage medium, where computer executable instructions are stored in the computer readable storage medium, and when a processor executes the computer executable instructions, the image processing method as described in the above first aspect and various possible designs of the above first aspect is implemented.

In a fifth aspect, an embodiment of the present disclosure provides a computer program product, including a computer program or instructions, when the computer program or the instructions are executed by a processor, the image processing method as described in the above first aspect and various possible designs of the above first aspect is implemented.

In a sixth aspect, an embodiment of the present disclosure provides a computer program, when the computer program is executed by a processor, the image processing method as described in the above first aspect and various possible designs of the above first aspect is executed.

The present embodiments provide an image processing method and apparatus, an electronic device, and a readable storage medium. The method includes: acquiring a to-be-processed image, where the to-be-processed image includes a target object; acquiring, by adopting a feature model, normal feature information and target feature information of the target object, where the target feature information includes: depth feature information and/or tangent feature information; performing, based on the normal feature information and the target feature information, a lighting rendering on the target object in the to-be-processed image to obtain a lighting-rendered-image; and outputting the lighting-rendered-image. In the embodiments of the present disclosure, the terminal device not only acquires the normal feature information of the target object, but also can acquire the depth feature information and/or tangent feature information of the target object. Since the depth feature information is related to a distance between the lighting and the object, and the tangent feature information is related to a distribution of the light formed by lighting on the object. Compared with the prior art, the terminal device may perform the lighting rendering on the target object based on richer feature information of the target object, which can enrich a lighting rendering effect and improve a user experience.

BRIEF DESCRIPTION OF DRAWINGS

In order to explain the embodiments of the present disclosure or the technical solutions in the prior art more clearly, the drawings needed to be used in the embodiments or the description of the prior art will be introduce briefly in the following. Obviously, the drawings in the following description are some embodiments of the present disclosure.

For those skilled in the art, other drawings can also be obtained from these drawings without paying creative effort.

FIG. 5 is a schematic diagram 2 of a training process of a feature model provided by an embodiment of the present disclosure.

DESCRIPTION OF EMBODIMENTS

Figure 1:
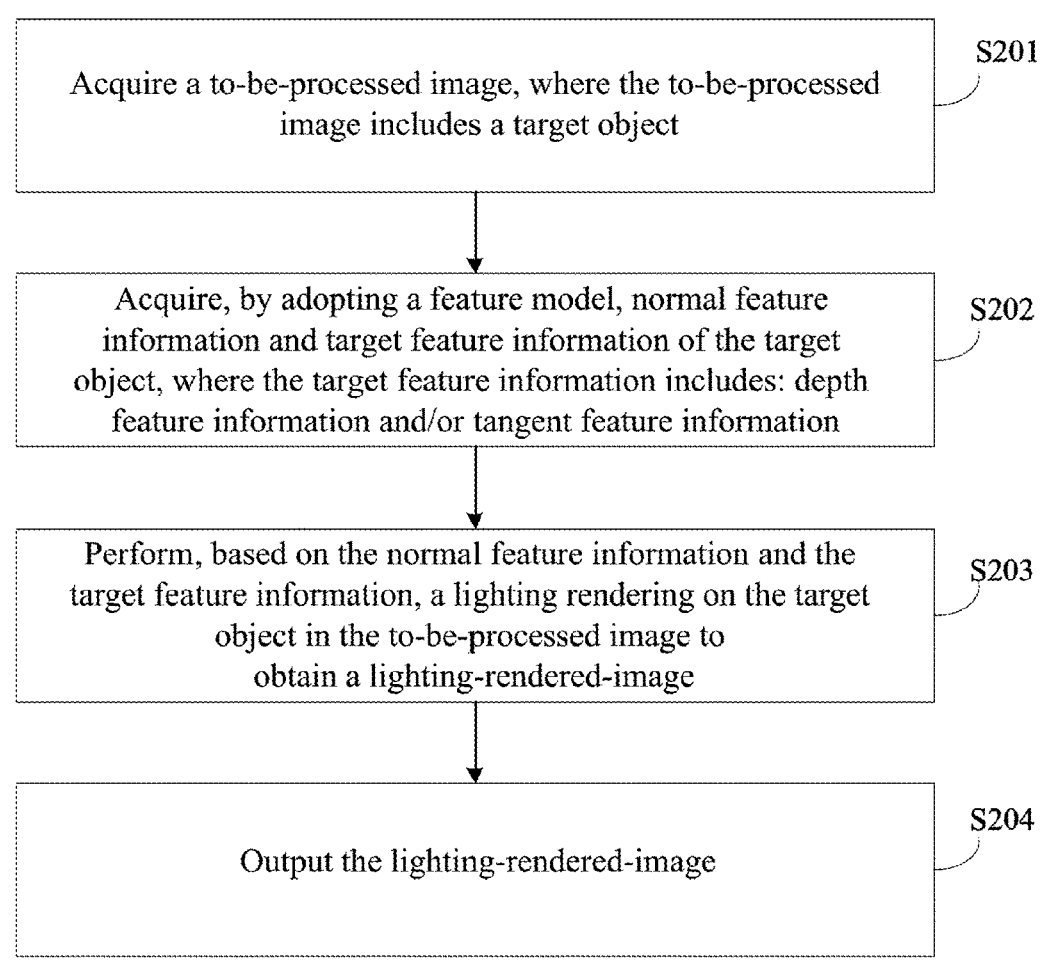
FIG. 1 is a schematic flowchart 1 of an image processing method provided by an embodiment of the present disclosure.

To make the purposes, technical solutions and advantages of embodiments of the present disclosure more clearly, the technical solutions in the embodiments of the present disclosure are clearly and completely described in the following with reference to the drawings of the embodiments of the present disclosure. Obviously, the described embodiments are part of embodiments of the present disclosure, not all embodiments. Based on the embodiments of the present disclosure, all other embodiments obtained by those skilled in the art without creative effort are all within the protection scope of the present disclosure.

In order to solve the technical problems existing in the prior art, the embodiments of the present disclosure provide the following solution idea: when performing a relighting processing on an object in an image, normal feature information and target feature information of the object in the image is acquired, the target feature information may include depth feature information and/or tangent feature information (tangent). Since the normal feature information is related to an angle of lighting (such as a directional light source), the depth feature information is related to a distance between the lighting and the object (or it may be understood as the depth feature information is related to a light intensity of the object that the light reaches), and the tangent feature information is related to a distribution of the light formed by lighting on the object. Therefore, compared with the prior art, in the embodiments of the present disclosure, different lighting renderings for the object in the image can be implemented based on richer feature information of the object, such as rendering objects with different angles, different intensities and/or different distribution of the lights and other rendering for the object, thereby achieving the purpose of enriching the rendering effect of the object. In an embodiment, the object in the image may be, but are not limited to, persons, animals, and household appliances, such as tableware. It should be understood that the image, a to-be-processed image and a sample image involved in the following embodiments may be pictures or video frames in a video.

Embodiments of the present disclosure provide a scenario to which the image processing method is applied. Exemplarily, a user may perform the lighting rendering on the object in the image through a terminal device. Exemplarily, the user may open an image retouching application in the terminal device, select the to-be-processed image in the image retouching application, where the to-be-processed image may be displayed on an interface of the terminal device, and the to-be-processed image includes the user's face and the user's hair. A "lighting rendering" control may be displayed on the interface of the terminal device, and the user clicks on the "lighting rendering" control, the terminal device may execute the image processing method provided by the embodiment of the present disclosure, so that the lighting rendering is performed on the object (the user's face and the user's hair) in the to-be-processed image to obtain the lighting-rendered-image. Exemplarily, the lighting rendering may be performing the lighting from a side of the user with a light intensity a, after the lighting rendering, the user's hair presents a lighting distribution in a shape of water ripples. It should be understood that the shape of the water ripples of the user's hair is merely an example.

Exemplarily, the "lighting rendering" control may be first displayed on the terminal device first, after the user selects an image, the terminal device may perform the lighting rendering on the object in the image. Alternatively, other image retouching controls may also exist on the interface of the above-mentioned terminal device, and the manner in which the user triggers the terminal device to perform the lighting rendering is not limited in the embodiments of the present disclosure. In an embodiment, the image processing method provided by the embodiment of the present disclosure may be applied to post-processing scenarios of various types of videos (e.g., film and television works), for example, the terminal device may take a video frame in a video as a to-be-processed image, and then perform the lighting rendering on the object in the to-be-processed image.

The terminal device in the embodiment of the present disclosure may include, but are not limited to, mobile phones, tablet computers, notebook computers, speakers, wearable devices, smart screens, smart home appliances, internet of things (IOT) devices, camera devices, and other devices with image processing capabilities. In an implementation, the terminal device may also be a personal digital assistant (PDA), a handheld device with a wireless communication function, a computing device, a virtual reality (VR) terminal device, a drone device, an augmented reality (AR) terminal device, a wireless terminal in an industrial control, a wireless terminal in a smart home, and the like. The form of the terminal device is not limited in the embodiments of the present disclosure.

Referring to FIG. 1, FIG. 1 is a schematic flowchart 1 of an image processing method provided by an embodiment of the present disclosure. The method of the embodiment may be applied to a terminal device, and the image processing method may include:

S201, acquire a to-be-processed image, where the to-be-processed image includes a target object.

The to-be-processed image may be a local image stored in the terminal device, for example, a user may select at least one local image in the terminal device, and the terminal device takes the local image selected by the user as the to-be-processed image. In an embodiment, the to-be-processed image may be an image shot by a terminal device, or the to-be-processed image may be an image imported into the terminal device. In an embodiment, the to-be-processed image may be an image sent by another electronic device to the terminal device, that is, another electronic device needs to perform lighting rendering on the image, and then sends the image to the terminal device for lighting rendering. The image may be a picture, a group of pictures, or a video. Each video frame in the video may be regarded as an image.

The target object is included in the to-be-processed image. The target objects may be, but are not limited to, persons, animals, items, etc. The items may be stainless steel tableware, ceramic tableware, plastic bags, and the like. In the following embodiments, it takes that the target object is a person as an example for illustration.

S202, acquire, by adopting a feature model, normal feature information and target feature information of the target object, where the target feature information includes: depth feature information and/or tangent feature information.

The feature model is used to extract the normal feature information and the target feature information of the target object in the to-be-processed image. The target feature information includes: the depth feature information and/or the tangent feature information. In an embodiment, the normal feature information may be a normal map, a normal matrix, or a normal feature vector of the target object. The depth feature information may be a depth map, a depth matrix, or a depth feature vector of the target object. The tangent feature information may be a tangent map, a tangent matrix, or a tangent feature vector of the target object.

In an embodiment, the feature model may be obtained by pre-training with sample data, and then the feature model is preset in the terminal device, so that the terminal device may adopt the feature model to acquire the normal feature information and the target feature information of the target object in the image. The executive entity for training the feature model may be the terminal device or other electronic devices. The other electronic devices can be such as a model training machine, a server, etc., and the executive entity of training to obtain the feature model is not limited in the embodiment of the present disclosure.

In an embodiment, the sample data may include a sample image and the normal feature information of the sample image. In an embodiment, the sample data may include the sample image, the normal feature information of a sample object in the sample image, and sample target feature information. The sample target feature information may include sample depth feature information and/or sample tangent feature information. It should be noted that a type of the sample target feature information included in the sample data is the same as a type of the target feature information output based on the feature model. Exemplarily, if the sample target feature information included in the sample data is the sample tangent feature information, the target feature information output based on the feature model is also the tangent feature information.

In an embodiment, after acquiring the to-be-processed image, the terminal device may input the to-be-processed image into the feature model, and the feature model may output the normal feature information and the target feature information of the target object in the to-be-processed image. It should be understood that, in this embodiment, a use process of the feature model is illustrated first, and the specific training process of the feature model may refer to the following related descriptions in FIG. 3 and FIG. 4. It should be noted that the type of the target object and the type of the sample object may be the same, if the target object is a person, the sample object may be a person. Exemplarily, if the target object is a person with hair, the sample object may include a person with hair.

It should be noted that the reason why the target feature information is acquired in addition to the normal feature information of the target object in the embodiment of the present disclosure is that: at present, the terminal device can only perform the lighting rendering on the target object at a certain angle based on the normal feature information. However, if the terminal device also acquires the depth feature information of the target object, because the depth feature information represents the distance between each pixel point of the target object and a shooting position, the terminal device may provide the target object with lighting rendering of point light sources at different distances based on the depth feature information. Because the point light sources at different distances from the target object have different lighting intensities reaching the target object, it may also be understood that the terminal device may provide lighting rendering with different lighting intensities for the target object.

In addition, if the target object has anisotropy, it is also necessary to acquire the tangent feature information of the target object to perform the lighting rendering of the lighting distribution on the target object. It will be understood that hair, body hair, dishes with stainless steel items all represent anisotropy. Exemplarily, if the target object is a user with hair, and the user's face and body are generally isotropic, the lighting rendering can be performed correctly without requiring the tangent feature information. However, the user's hair is anisotropic, and the lighting distribution on the hair should be in the shape of water ripples, if the terminal device does not acquire the tangent feature information of the hair, the lighting distribution on the hair is the same as that on the user's face and body, the lighting distribution is in the shape of a aperture, which is different from the lighting distribution of hair under lighting in a real life, resulting in a poor rendering effect of hair. In the embodiment of the present disclosure, the terminal device may acquire the tangent feature information of the target object, and can perform an accurate rendering of lighting distribution on both isotropic and anisotropic objects. The rendering effect is good, and the rendering effect of anisotropic objects is improved.

In an embodiment, the more information contained in the target feature information, the better the lighting rendering effect.

S203, perform, based on the normal feature information and the target feature information, a lighting rendering on the target object in the to-be-processed image to obtain a lighting-rendered-image.

Since the normal feature information is related to the angle of the light, the depth feature information is related to the distance between the lighting and the object, and the tangent feature information is related to the distribution of the light formed by lighting on the object. In an embodiment, the terminal device may determine the light angle based on the normal feature information. The terminal device determines the light intensity (or the distance between the point light source and the target object) based on the depth feature information. And the terminal device determines the distribution of the light formed by lighting on the target object based on the tangent feature information. Exemplarily, the distribution of the light formed by lighting on the object may include: the distribution of the light formed by lighting on the face of the user is in an aperture shape, and the distribution of the light formed by lighting on the hair is in the shape of water ripples.

In an embodiment, the terminal device may perform the lighting rendering on the target object based on the light angle, the light intensity, and the distribution of light formed by lighting on the object. The lighting rendering may be: the terminal device superimposes a layer of the light angle (such as the light from the side of the user) and a layer corresponding to the light intensity (the light intensity is a), and a layer corresponding to the distribution of light formed by lighting on the object (the shape of water ripples) and the target object in the to-be-processed image to obtain the lighting-rendered-image.

S204, output the lighting-rendered-image.

Figure 2:
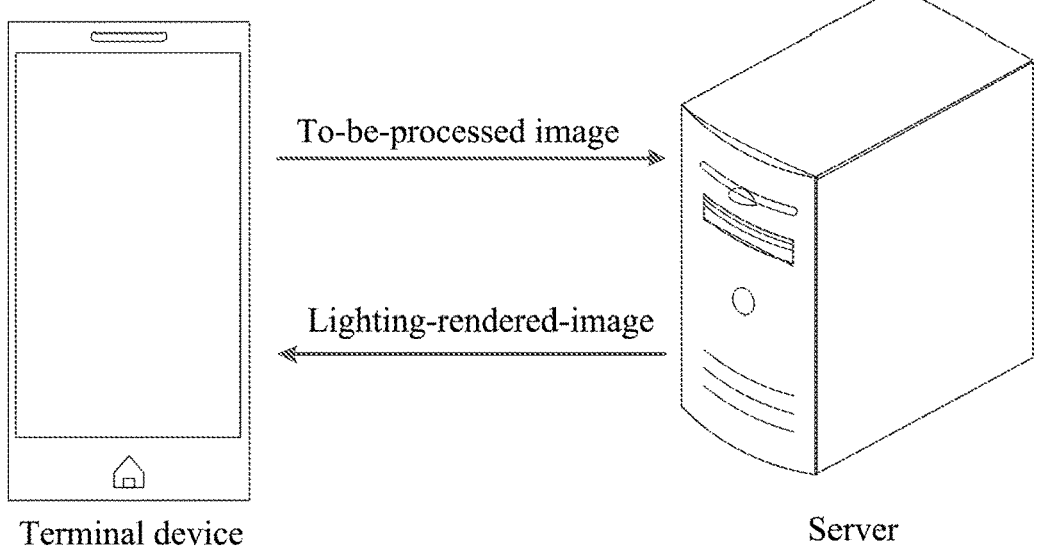
FIG. 2 is a schematic diagram of a scenario where an image processing method provided by an embodiment of the present disclosure is applied.

In an embodiment, the terminal device may display the lighting-rendered-image. Alternatively, in an embodiment, the terminal device may output the lighting-rendered-image to another electronic device, and another electronic device may be a device that requests the terminal device to perform the lighting rendering on the image, such as a smart wearable device, as shown in FIG. 2. FIG. 2 is a schematic diagram of a scenario where an image processing method provided by an embodiment of the present disclosure is applied. After receiving the lighting-rendered-image, another electronic device may display the lighting-rendered-image.

The image processing method provided by the embodiment of the present disclosure includes: a terminal device acquires the to-be-processed image, where the to-be-processed image includes the target object, acquires, by adopting a feature model, normal feature information and target feature information of the target object, where the target feature information includes: depth feature information and/ or tangent feature information, performs, based on the normal feature information and the target feature information, a lighting rendering on the target object in the to-be-processed image to obtain a lighting-rendered-image, and outputs the lighting-rendered-image. In the embodiment of the present disclosure, when performing the lighting rendering on the target object in the image, the terminal device not only acquires the normal feature information of the target object, but also acquires the depth feature information and/or the tangent feature information of the target object. Since the depth feature information is related to a distance between the lighting and the object, and the tangent feature information is related to a distribution of the light formed by lighting on the object. Compared with the prior art, the terminal device may perform the richer lighting rendering on the target object based on richer feature information of the target object, for example, the lighting rendering with different angles, different lighting intensities and/or different lighting distributions is performed on the target object, thereby enriching a lighting rendering effect and improving a user experience.

Figure 3:
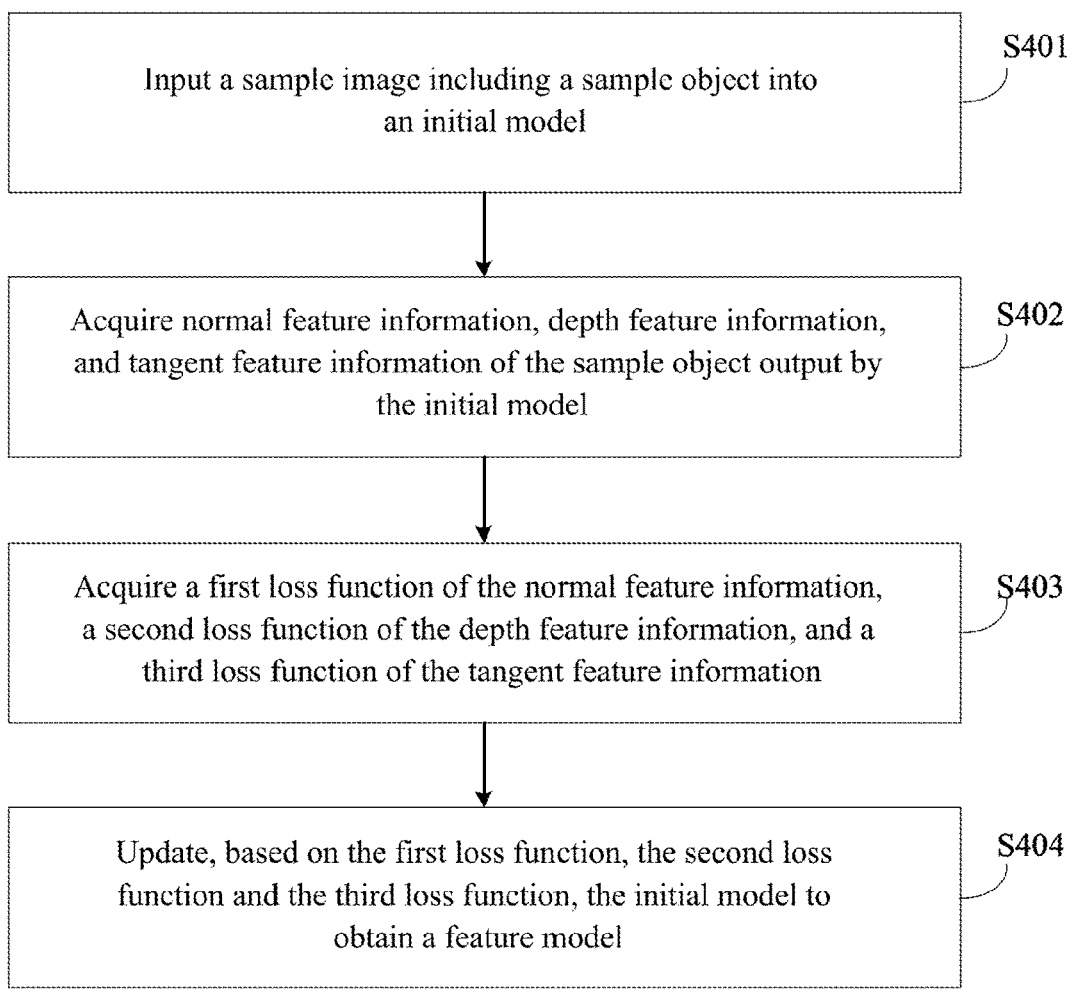
FIG. 3 is a schematic diagram 1 of a training process of a feature model provided by an embodiment of the present disclosure.

In order to introduce the image processing method provided by the embodiment of the present disclosure more clearly, the process of training to obtain a feature model in the embodiment of the present disclosure will be illustrated with reference to FIG. 3. The executive entity of a training feature model may be a server, and the executive entity of the training feature model may also be a terminal device or an electronic device with training capability. The executive entity of training the feature model is not limited in the embodiment of the present disclosure. Referring to FIG. 3, the method training to obtain the feature model may include:

S401, input a sample image including a sample object into an initial model.

The initial model may be an initial framework of the training feature model. The initial model may be, but is not limited to, Unet neural network based on fully convolutional networks (FNC) framework, lightweight neural network shufflenet, and convolutional neural network (CNN). The sample image may be input into the initial model for training.

It should be noted that, in addition to the sample image, the sample data for training to obtain the feature model may also include: the sample normal feature information of the sample object in the sample image. In an embodiment, the sample data includes: the sample image, and sample normal feature information and the sample target feature information of a sample object in the sample image. The sample target feature information may include the sample depth feature information and/or the sample tangent feature information. It should be understood that the sample normal feature information, the sample depth feature information and the sample tangent feature information may be regarded as accurate feature information of the sample object, and may be referred to as labeling information of the features of the sample object.

In an embodiment, the sample normal feature information may include a sample normal map, the sample depth feature information may include a sample depth map, and the sample tangent feature information may include a sample tangent map. In addition, the sample normal feature information, the depth feature information, and the tangent feature information may also include other types of representations, such as feature vectors, feature matrices, etc., which are not limited in the present disclosure. In the following embodiments, the (normal/depth/tangent) feature information is used as the (normal/depth/tangent) map for illustration.

S402, acquire normal feature information, depth feature information, and tangent feature information of the sample object output by the initial model.

In the embodiment of the present disclosure, the processing process of a sample image in training is illustration. In the training process, after the sample image is input into the initial model, the initial model may output the normal feature information, the depth feature information and the tangent feature information of the sample object in the sample image.

Figure 4:
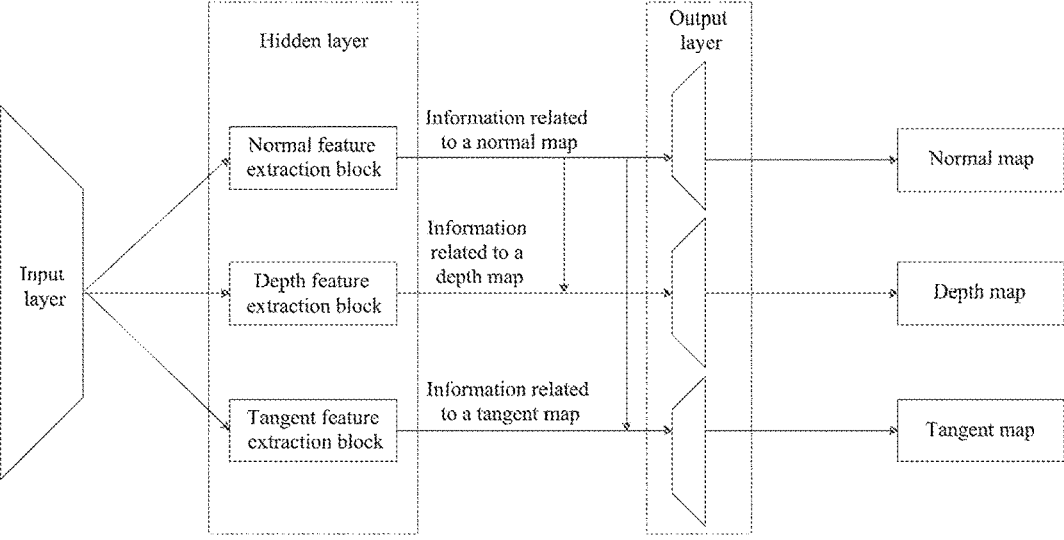
FIG. 4 is a schematic structural diagram of an initial model provided by an embodiment of the present disclosure.

FIG. 4 is a schematic structural diagram of an initial model provided by an embodiment of the present disclosure. Referring to FIG. 4, the initial model includes an input layer, a hidden layer, and an output layer, the hidden layer includes a normal feature extraction block, a depth feature extraction block, and a tangent feature extraction block. The input layer is used to input the sample image to the normal feature extraction block, the depth feature extraction block and the tangent feature extraction block. In an embodiment, the input layer and the output layer may adopt the Unet neural network, and the hidden layer may adopt the shufflenet neural network. The normal feature extraction block, the depth feature extraction block, and the tangent feature extraction block may also be referred to as three branches in the initial model.

The normal feature extraction block is used to extract information related to a normal map in the sample object of the sample image, acquire the normal map based on the information related to the normal map, and output the normal map of the sample object through the output layer. The normal feature extraction block is also used to output information related to the normal map to the depth feature extraction block and the tangent feature extraction block. The depth feature extraction block is used to extract information related to a depth map in the sample object of the sample image, acquire the depth map according to the information related to the depth map and the information related to the normal map, and output the depth map of the sample object through the output layer. The tangent feature extraction block is used to extract the information related to a tangent map in the sample object of the sample image, acquire the tangent map according to the information related to the tangent map and the information related to the normal map, and output the tangent map of the sample object through the output layer. The information related to the normal map may be a normal feature of the sample object, such as a normal vector. The information related to the depth map may be a depth feature of the sample object, and the information related to the tangent map may be a tangent feature of the sample object.

During the training process of the feature model, the normal map of the sample object may be output. Because an accuracy of the normal map is high, in the embodiment of the present disclosure, the depth map and the tangent map may be obtained by combining the information related to the preset normal map, thereby improving the accuracy of the depth map and the tangent map.

S403, acquire a first loss function of the normal feature information, a second loss function of the depth feature information, and a third loss function of the tangent feature information.

For the normal map, the depth map and the tangent map output by the initial model, in order to verify the accuracy of the normal map, the depth map and the tangent map, the first loss function of the normal feature information, the second loss function of the depth feature information, and the third loss function of the tangent feature information may be acquired to update a weight between the input layer and the hidden layer in the initial model, as well as a weight between the hidden layer and the output layer, so that the normal map, the depth map and the tangent map output by the initial model are more accurate. It should be understood that a loss function represents an error between the feature information and the labeling information obtained by the initial model, the larger the loss function, the greater the error, and the less accurate a training result of the initial model. When the error between the feature information and the labeling information obtained by the initial model is less than an error threshold, the training result of the initial model is accurate.

In an embodiment, for a scenario in which the sample data includes "the sample normal map of the sample image and the sample object", the first loss function may be obtained based on the normal map and the sample normal map. Exemplarily, L1 loss function formula is adopted to acquire the first loss function based on the normal map and the sample normal map. Because there is no sample depth map and sample tangent map of the sample object in the sample data, the normal feature information may be acquired according to the depth map, and then the normal map corresponding to the depth map is obtained. And then the L1 loss function formula may be adopted to acquire the second loss function based on the normal map corresponding to the sample normal map and the depth map. Similarly, the tangent map and the normal map may be dot multiplied to acquire a dot multiplication result, and then the L1 loss function formula may be adopted to acquire the third loss function based on the dot multiplication result and 0.

It should be understood that the depth map is used to represent a depth of each pixel point of the sample object. In an embodiment, taking a pixel point on the sample object as an example, a depth gradient of the pixel point may be acquired based on the depth of the pixel point and the depth of the pixel points around the pixel point, and the normal feature information of the pixel point, such as the normal vector, may be acquired based on the depth gradient of the pixel point. And then the normal map of the sample object, that is, the normal map corresponding to the depth map of the sample object, may be obtained based on the normal feature information of each pixel point of the sample object.

Alternatively, in an embodiment, a binary image of the sample object may be obtained based on the depth map of the sample object, and a grayscale of each pixel point on the binary image is proportional to the depth of the pixel point. Taking one pixel point on the sample object as an example, a grayscale gradient of the pixel point may be acquired based on the grayscale of the pixel point and the grayscale of the pixel points around the pixel point, and the normal feature information of the pixel point may be acquired based on the grayscale gradient of the pixel point. And then the normal map of the sample object may be obtained based on the normal feature information of each pixel point of the sample object. The embodiment of the present application does not limit the manner of obtaining the normal map of the sample object based on the depth map of the sample object.

In an embodiment, for a scenario in which the sample data includes "the sample image, the sample normal map of the sample object, the sample depth map of the sample object and the sample tangent map of the sample object", the first loss function, the second loss function and the third loss function respectively may be acquired by adopting the above method. The second loss function may also be acquired based on the depth map and the sample depth map by adopting the L1 loss function formula, or the third loss function may also be acquired based on the tangent map and the sample tangent map by adopting the L1 loss function formula.

S404, update, based on the first loss function, the second loss function and the third loss function, the initial model to obtain a feature model.

In the embodiment of the present disclosure, a weight between each neuron in the input layer in an initial module and each neuron in the normal feature extraction block, and a weight between each neuron in the normal feature extraction block and each neuron in the output layer may be updated based on the first loss function. A weight between each neuron in the input layer and each neuron in the depth feature extraction block, and a weight between each neuron in the depth feature extraction block and each neuron in the output layer may be updated based on the second loss function. A weight between each neuron in the input layer and each neuron in the tangent feature extraction block, and a weight between each neuron in the tangent feature extraction block and each neuron in the output layer may be updated based on the third loss function. In an embodiment, based on the first loss function, the second loss function and the third loss function, the weight between each neuron in the initial model may be updated by adopting a back propagation (back propagation) manner.

It should be understood that after the updated initial model is obtained, the initial model may be continued to be trained based on the updated initial model and the sample data, until the number of training times reaches a preset number of training times, the training is terminated to obtain the feature model. In an embodiment, if the first loss function output by the updated initial model (or the initial model) is smaller than a first preset value, the second loss function output by the updated initial model (or the initial model) is smaller than a second preset value, and the third loss function output by the updated initial model (or the initial model) is smaller than a third preset value, the training is terminated to obtain the feature model.

In conclusion, the feature model may be obtained by training, and the feature model may be preset in the terminal device.

In an embodiment, the sample image may be pre-processed, and the pre-processed sample image may be input to the initial model for training, so as to obtain the feature model with a higher prediction accuracy.

Referring to FIG. 5, before the above S401, the following may include:

S405, acquire, based on the sample image, a mask image of the sample object in the sample image.

The mask image (mask) of the sample object may be a binary image. For example, a pixel point of the sample object in the sample image may be set as 1, and a pixel point of a non-sample object may be set as 0, that is, the sample object in the sample image appears white, and the non-sample image appears black. In an embodiment, the mask image of the sample object may be a grayscale image, the grayscale of the pixel point of the sample object may be 255, and the grayscale of the pixel point of the non-sample object may be 0. The mask image of the sample object is not limited in the embodiment of the present disclosure, as long as the pixel points of the sample object and the pixel points of the non-sample object in the sample image can be effectively distinguished.

In an embodiment, the sample object in the sample image may be identified, and then the pixel point of the sample object in the sample image is set as 1, and the pixel point of the non-sample object is set as 0, so as to acquire the mask image of the sample object. In an embodiment, the mask image of the sample object is acquired by adopting a portrait matting technology.

Figure 6:
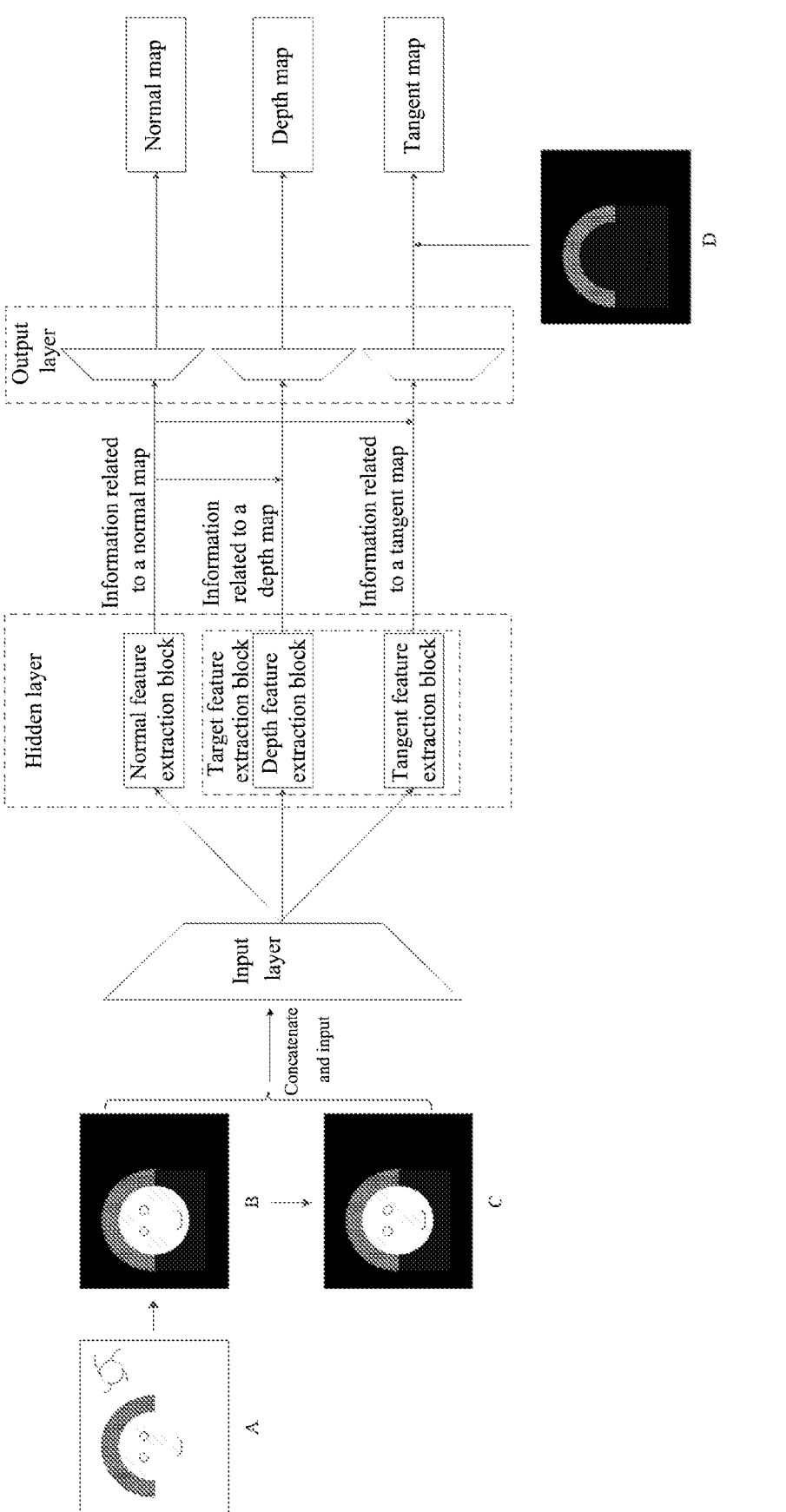
FIG. 6 is a schematic diagram of a sample image processing provided by an embodiment of the present disclosure.

FIG. 6 is a schematic diagram of a sample image processing provided by an embodiment of the present disclosure. Referring to FIG. 6, the sample image is an image A including the user's face and the user's hair, the mask image of the sample image may be as shown in B in FIG. 6. The image A also includes a background part, such as the sun.

S406, acquire, based on the sample image, the mask image of a target portion of the sample object, where the target portion has anisotropy.

The target portion may be an entire area or a partial area of the sample object. The target portion has anisotropy, exemplarily, the sample object is the user (including the user's face and the user's hair), and the target portion of the sample object may be the user's hair, where the hair has anisotropy. Correspondingly, a mask image of the user's hair may be acquired based on an image A, as shown in D in FIG. 6. It should be understood that, the method for acquiring the mask image of the target portion may refer to the above-mentioned related description of acquiring the mask image of the sample object. In addition, those skilled in the art should understand that the mask image of the target portion may be pre-acquired or pre-set, which is not limited in the present disclosure.

In an embodiment, the mask image of the target portion of the sample object may be used as sample data.

S407, adjust, based on the mask image of the sample object, pixel points other than the sample object in the sample image to preset value to acquire the processed sample image.

After the mask image of the sample object is acquired, since a size of the mask image of the sample object is the same as a size of the sample image, the pixel points other than the sample object in the sample image can be adjusted to the preset value based on a corresponding relationship between the mask image of the sample object and the pixel points of the sample image.

Exemplarily, taking that the preset value is 0 and the sample object is the user as an example for illustration, the pixel points other than the user in the sample image may be adjusted to 0, so that the user in the sample image appears in color, and the pixel points other than the user appear in black, as shown in C in FIG. 6. It should be understood that a foreground portion of C in FIG. 6 is actually colored, although it is represented in black and white in FIG. 6.

Correspondingly, the above S401 may be replaced with the following S408:

S408, concatenate the mask image of the sample object and the processed sample image and input the concatenated mask image and the concatenated processed sample image to the initial model.

The sample image may be a color image. In an embodiment, when the mask image of the sample object is obtained by segmenting the sample image, due to an influence of external factors such as a light, the acquired mask image of the sample object also contains some pixel points of non-sample objects. In order to improve a prediction accuracy of the feature model, in the embodiment of the present disclosure, the mask image of the sample object and the processed sample image may be concatenated (concat), and the concatenated mask image of the sample object and the concatenated processed sample image may be input to the initial model.

Because the processed sample image is obtained based on the mask image of the sample object, if the mask image of the sample object also contains some pixel points of non-sample object, the foreground portion (color portion) of the processed sample image includes some pixel points in the background area (i.e., pixel points of non-sample object). Because the sample object of the processed sample image is colored, and contains more information than the foreground portion of the mask image of the sample object. Therefore, in the embodiment of the present disclosure, the mask image of the sample object and the processed sample image are concatenated and input to the initial model, so that in the process of training to obtain the feature model, a boundary of the sample object in the sample image can be more accurately identified, thereby improving the prediction accuracy of the feature model.

In an embodiment, the sample data may further include the sample tangent diagram of the target portion of the sample object. Referring to FIG. 6, the user's mask image and the processed sample image may be concatenated and input to the initial model. Correspondingly, in the training process, in addition to adopting the above relevant description in FIG. 3 to acquire the third loss function, the third loss function may also be obtained in the following ways.

Because only the target portion (for example, the hair) in the sample object has anisotropy, in the embodiment of the present disclosure, a calculation of the third loss function may be performed only for the target portion. Exemplarily, the target portion of the user is the hair, the calculation of the third loss function may be performed for the user's hair. For example, based on the mask image of the hair, the tangent map of the hair may be acquired from the user's tangent map output by the initial model. Exemplarily, based on the hair mask, a portion of the tangent map corresponding to the pixel points of the hair, that is, the tangent map of the hair, may be acquired in the user's tangent map. The third loss function of the user's hair may be acquired based on the tangent map of the hair and the sample tangent map of the hair by adopting the L1 loss function formula, as shown in FIG. 6.

In an embodiment, if the sample tangent map of the target portion of the sample object is not included in the sample data, the tangent map of the target portion and the normal map of the target portion may be adopted to perform dot multiplication, and then the third loss function of the target portion of the sample object is acquired based on a dot multiplication result and 0 by adopting the L1 loss function formula. It should be understood that the normal map of the target portion may be acquired from the normal map of the sample object based on the mask image of the target portion.

To sum up, in the embodiment of the present disclosure, the sample image may be pre-processed, and the mask image of the sample object and the processed sample image are concatenated and input to the initial model to train to obtain the feature model, which can improve the prediction accuracy of the feature model.

Figure 7:
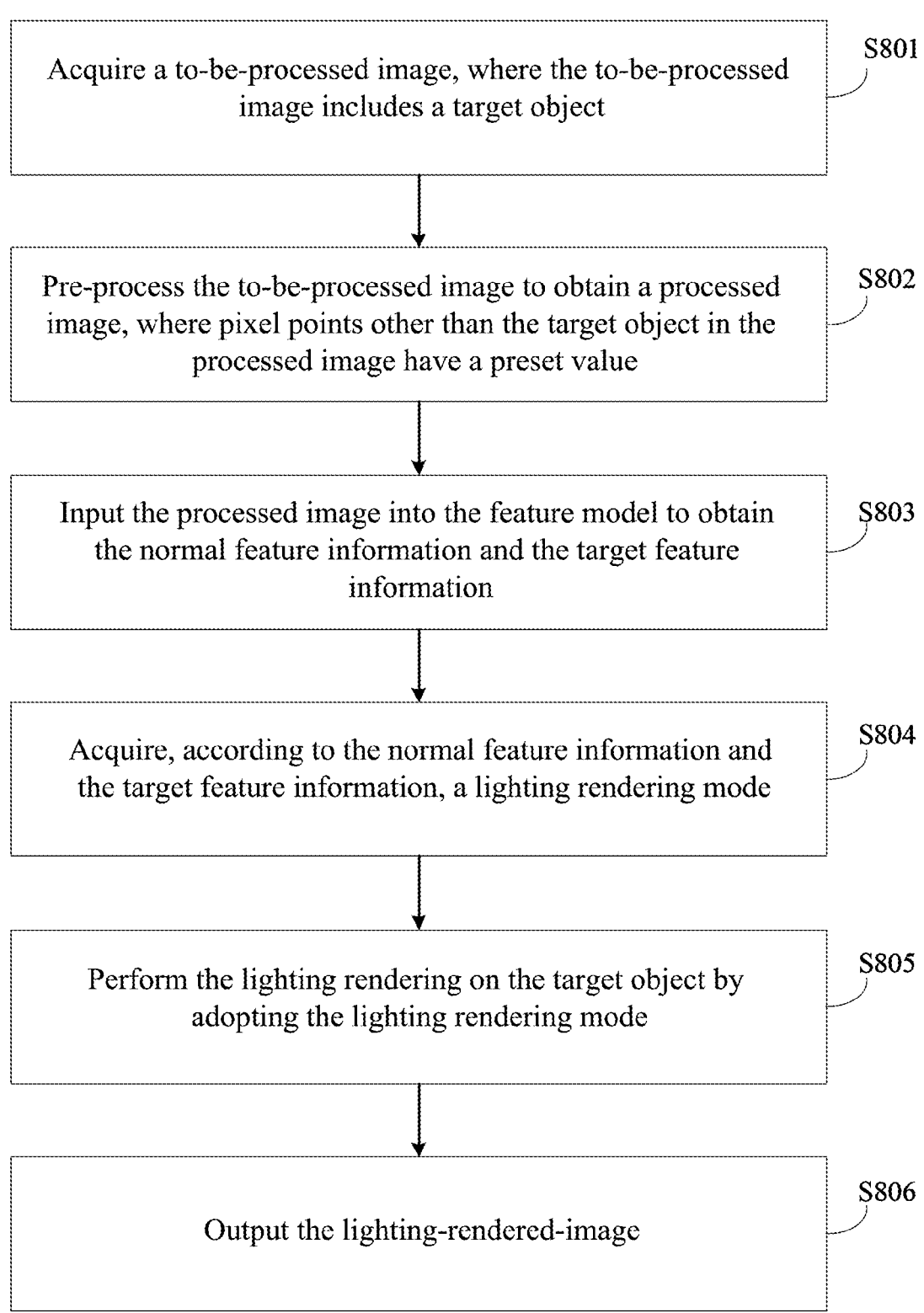
FIG. 7 is a schematic flowchart 2 of an image processing method provided by an embodiment of the present disclosure.

Compared with the feature model shown in FIG. 4 above, the feature model shown in FIG. 6 above adds a process of sample image pre-processing, which can improve the prediction accuracy of the feature model. The following embodiments of the present disclosure may acquire the normal feature information and the target feature information of the image based on the feature model in FIG. 6, thereby improving an effect of the lighting rendering. FIG. 7 is a schematic flowchart 2 of an image processing method provided by an embodiment of the present disclosure. Referring to FIG. 7, the image processing method provided by the embodiment of the present disclosure may include the following.

S801, acquire a to-be-processed image, where the to-be-processed image includes a target object.

S802, pre-process the to-be-processed image to obtain a processed image, where pixel points other than the target object in the processed image have a preset value.

The terminal device may acquire a mask image of the target object based on the to-be-processed image, and then adjust the pixel points other than the target object in the to-be-processed image to preset value based on the mask image. Based on the relevant description of the pre-processing of the sample image when the feature model is obtained by training, in the embodiment of the present disclosure, the terminal device may adopt the same method to pre-process the to-be-processed image, and the details may refer to the above relevant description.

It should be understood that, in the embodiment of the present disclosure, the terminal device pre-processes the to-be-processed image, and the pixel points other than the target object in the processed image have the preset value, then the feature model may completely focus on the target object in the foreground portion, when the normal feature information and the target feature information of the target object are acquired by adopting the feature model, thereby improving the accuracy of the acquired normal feature information and target feature information of the target object.

Exemplarily, the to-be-processed image may be as shown in A in FIG. 6, the target object is the user, and the target portion of the target object is the user's hair. The terminal device may acquire a mask image B of the user, and refer to the above relevant description of S406. The terminal device may adjust the pixel points other than the user in the to-be-processed image to 0 based on the mask image B of the user, that is, a part other than the user in the to-be-processed image is adjusted to be black, thereby obtaining a processed image C.

S803, input the processed image into the feature model to obtain the normal feature information and the target feature information.

In the embodiment of the present disclosure, the terminal device may input the processed image into the feature model, and then obtain the normal feature information and the target feature information of the target object output by the feature model. In an embodiment, the normal feature information may be a normal map, or a normal vector or a normal matrix, and the like. The normal feature information is taking as the normal map as an example for illustration in the following.

Similar to the structure of the initial model shown in FIG. 4, the feature model may include: an input layer, a hidden layer and an output layer. The input layer is used to input the to-be-processed image to the hidden layer. The hidden layer is used to acquire the normal feature information and the target feature information of the target object in the to-be-processed image based on the to-be-processed image, and output the normal feature information and the target feature information of the target object through the output layer.

In an embodiment, the hidden layer includes a normal feature extraction block and a target feature extraction block. The normal feature extraction block is used to extract information related to the normal map in the target object of the to-be-processed image, acquire the normal map based on the information related to the normal map, and output the normal map of the target object through the output layer. The normal feature extraction block is also used to output the information related to the normal map to the target feature extraction block. The target feature extraction block is used to extract information for the target object related to the target feature information of the to-be-processed image, acquire the target feature information based on the information for the target object related to the target feature information and the information for the target object related to the normal feature information, and output the target feature information through the output layer.

In an embodiment, the target feature extraction block may include a depth feature extraction block and a tangent feature extraction block. In the embodiment, the input layer may be used to input the to-be-processed image to the normal feature extraction block, the depth feature extraction block and the tangent feature extraction block.

The normal feature extraction block is used to extract the information related to the normal map in the target object of the to-be-processed image, acquire the normal map based on the information related to the normal map, and output the normal map of the target object through the output layer. The normal feature extraction block is also used to output the information related to the normal map to the depth feature extraction block and the tangent feature extraction block. The depth feature extraction block is used to extract the information related to the depth map in the target object of the to-be-processed image, acquire the depth map according to the information related to the depth map and the information related to the normal map, and output the depth map of the target object through the output layer. The tangent feature extraction block is used to extract the information related to the tangent map in the target object of the to-be-processed image, acquire the tangent map according to the information related to the tangent map and the information related to the normal map, and output the tangent map of the target object through the output layer. The information related to the normal map may be the normal feature of the target object, such as the normal vector, the normal matrix, and the like. Similarly, the information related to the depth map may be the depth feature of the target object, and the information related to the tangent map may be the tangent feature of the target object.

In an embodiment, in S803, "the information related to the normal map" may be replaced with "the information related to the normal feature information", "the information related to the depth map" and "the information related to the tangent map" may be replaced with "the information related to the target feature information". Where "the information related to the depth map" may be replaced with "the information related to the depth feature information", and "the information related to the tangent map" may be replaced with "the information related to the tangent feature information".

Accordingly, the terminal device inputs the processed image into the feature model, and may extract the information for the target object related to the normal feature information, as well as the information for the target object related to the target feature information, and then acquire the normal feature information based on the information for the target object related to the normal feature information, acquire the target feature information for the target object based on the information for the target object related to the normal feature information and the information for the target object related to the target feature information.

In an embodiment, the normal feature information includes the normal map, the depth feature information includes the depth map, and the tangent feature information includes the tangent map. When the target feature information includes the depth feature information and the tangent feature information, the normal feature extraction block in the feature model may extract the information related to the normal map of the target object based on the processed image, the depth feature extraction block may extract the information related to the depth map of the target object based on the processed image, and the tangent feature extraction block may extract the information related to the tangent map of the target object based on the processed image. The normal feature extraction block may acquire the normal map of the target object based on the information related to the normal map of the target object. The depth feature extraction block may acquire the depth map of the target object based on the information related to the normal map of the target object and the information related to the depth map of the target object. The tangent feature extraction block may acquire the tangent map of the target object based on the information related to the normal map of the target object and the information related to the tangent map of the target object. It should be understood that the information related to the normal map may be the normal feature of the target object, the information related to the depth map may be the depth feature of the target object, and the information related to the tangent map may be the tangent feature of the target object.

Exemplarily, the terminal device may adjust the part other than the user to be a black "processed image" and input the "processed image" into the feature model, so as to obtain the target feature information and the normal feature information of the user. In an embodiment, when the target feature information includes the depth feature information, the depth feature information may be the normal feature information of the user. In an embodiment, when the target feature information includes the tangent feature information, the tangent feature information may be the tangent feature information of the user or the tangent feature information of the user's hair.

In an embodiment, the terminal device may acquire the tangent feature information of the user's hair from the tangent feature information of the user based on the mask image D of the user's hair. For example, the tangent feature information corresponding to the pixel points of the hair in the mask of the hair in the tangent feature information of the user is taken as the tangent feature information of the hair.

In an embodiment, in order to improve the accuracy of the feature map (the normal map, the depth map, the tangent map) of the target object acquired by the depth model, the above S803 may be replaced as: the mask image of the target object (as shown in image B in FIG. 6) and the processed image (as shown in image C in FIG. 6) are concatenated and input to the feature model. Where the pixel points other than the target object in the processed image have the preset value, and "the mask image of the target object and the processed image are concatenated" may be understood as: the pixel points of the mask image of the target object and the pixel points of the processed image are concatenated in one-to-one correspondence, and the concatenated mask image of the target object and the concatenated processed image are input to the feature model.

Exemplarily, the terminal device may adjust the part other than the user to be the black "processed image", and input the user's mask image after concatenating into the feature model, so as to obtain the target feature information and the normal feature information of the user, thereby improving the accuracy of the normal feature information and the target feature information.

S804, acquire, according to the normal feature information and the target feature information, a lighting rendering mode.

In an embodiment, the terminal device stores lighting rendering modes corresponding to each normal feature information and each target feature information. That is to say, the normal feature information is different, and the lighting rendering mode is different. Similarly, the target feature information is different, and the lighting rendering mode is different. In the embodiment of the present disclosure, after acquiring the normal feature information and the target feature information of the target object, the terminal device may acquire the lighting rendering mode of the target object based on the lighting rendering modes corresponding to the each normal feature information and the each target feature information.

In an embodiment, the terminal device may adopt a table form, a database form, or an extensible markup language (XML) form to store the lighting rendering modes corresponding to the each normal feature information and the each target feature information, which is not limited in the embodiment of the present disclosure.

S805, perform the lighting rendering on the target object by adopting the lighting rendering mode.

After determining the lighting rendering mode of the target object, the terminal device may perform the lighting rendering on the target object based on a lighting rendering parameter corresponding to the lighting rendering mode.

Taking the target feature information including the depth feature information and the tangent feature information, and the tangent feature information being the tangent feature information of the user's hair as an example, the terminal device may acquire the lighting rendering modes corresponding to the normal feature information, the depth feature information and the tangent feature information.

Exemplarily, the terminal device adopts the lighting rendering mode, and may light the user from the side of the user with a light intensity a, and the terminal device renders the user's hair, so that the user's hair presents a lighting distribution in the shape of water ripples.

S806, output the lighting-rendered-image.

It should be understood that, S801 and S806 in the embodiment of the present disclosure may refer to the relevant descriptions in S201 and S204 in the foregoing embodiments.

In the embodiment of the present disclosure, the terminal device may pre-process the to-be-processed image, and concatenate the mask image of the target object and the processed image and then input the concatenated mask image of the target object and the concatenated processed image into the feature model, so as to acquire more accurate normal feature information and the target feature information of the target object, which can improve a lighting rendering effect.

Figure 8:
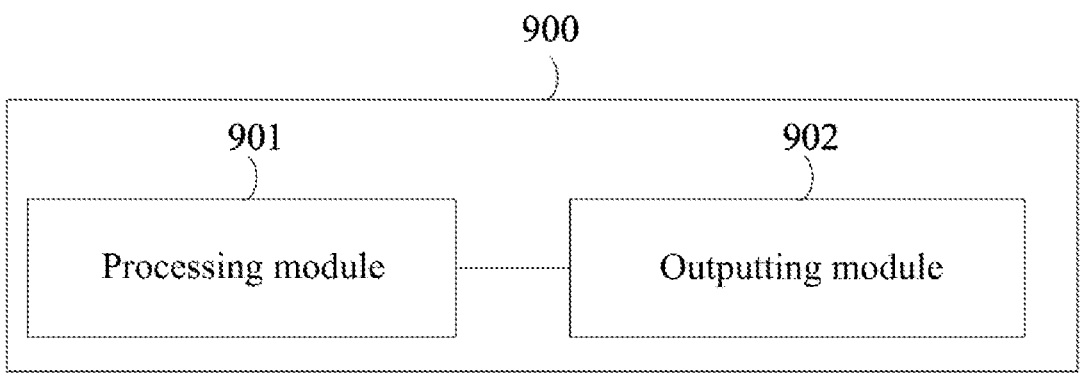
FIG. 8 is a structural block diagram of an image processing apparatus provided by an embodiment of the present disclosure.

FIG. 8 is a structural block diagram of an image processing apparatus provided by an embodiment of the present disclosure. The image processing apparatus may be a terminal device in the foregoing embodiment, or may be a chip or a processor in the terminal device. For convenience of explanation, only the parts related to the embodiment of the present disclosure are shown. Referring to FIG. 8, the image processing apparatus 900 includes: a processing module 901 and an outputting module 902.

The processing module 901 is configured to acquire a to-be-processed image, where the to-be-processed image includes a target object; acquire, by adopting a feature model, normal feature information and target feature information of the target object, where the target feature information includes: depth feature information and/or tangent feature information; and perform, based on the normal feature information and the target feature information, a lighting rendering on the target object in the to-be-processed image to obtain a lighting-rendered-image.

The outputting module 902 is configured to output the lighting-rendered-image.

In a possible implementation manner, the feature model is specifically configured to: extract information for the target object related to the normal feature information and information for the target object related to the target feature information; acquire, based on the information for the target object related to the normal feature information, the normal feature information; acquire, based on the information for the target object related to the normal feature information and the information for the target object related to the target feature information, the target feature information.

In a possible implementation manner, the processing module 901 is further configured to pre-process the to-be-processed image to obtain a processed image, where pixel points other than the target object in the processed image have a preset value; and input the processed image into the feature model to obtain the normal feature information and the target feature information.

In a possible implementation manner, the processing module 901 is specifically configured to acquire, based on the to-be-processed image, a mask image of the target object; adjust, based on the mask image, the pixel points other than the target object in the to-be-processed image to the preset value; concatenate the mask image and the processed image and inputting the concatenated image to the feature model.

In a possible implementation manner, the processing module 901 is specifically configured to acquire, according to the normal feature information and the target feature information, a lighting rendering mode; and perform the lighting rendering on the target object by adopting the lighting rendering mode.

In a possible implementation manner, the feature model is trained to obtain by using a sample image, a sample normal feature information of a sample object in the sample image, and a sample target feature information of the sample object as sample data, the sample target feature information includes sample depth feature information and/or sample tangent feature information.

In a possible implementation manner, the normal feature information is a normal map, the depth feature information is a depth map, the tangent feature information is a tangent map; and the sample normal feature information is a sample normal map, the sample depth feature information is a sample depth map, and the sample tangent feature information is a sample tangent map.

In a possible implementation manner, the feature model in a training process is an initial feature model, model parameters related to the normal feature information output by the initial feature model in the initial feature model are updated based on a first loss function, and the first loss function is obtained based on the sample normal feature information and the normal feature information output by the initial feature model.

In a possible implementation manner, the model parameters related to the depth feature information output by the initial feature model in the initial feature model are updated based on a second loss function; where the second loss function is obtained based on the sample depth feature information and the depth feature information output by the initial feature model; and/or, the second loss function is obtained based on the normal feature information obtained from the depth feature information output by the initial feature model, and the sample normal feature information.

In a possible implementation manner, the model parameters related to the tangent feature information output by the initial feature model in the initial feature model are updated based on a third loss function; where, the third loss function is obtained based on the tangent feature information output by the initial feature model and the normal feature information output by the initial feature model; and/or, the sample data further includes: the sample tangent feature information of a target portion of the sample object and a mask image of the target portion, the target portion has anisotropy, and the third loss function is obtained based on the sample feature information of the target portion, the mask image of the target portion, and the tangent feature information output by the initial feature model.

In a possible implementation manner, the feature model includes: an input layer, a hidden layer, and an output layer; the input layer is used to input the to-be-processed image to the hidden layer; the hidden layer is used to: acquire, based on the to-be-processed image, the normal feature information and the target feature information; output, through the output layer, the normal feature information and the target feature information.

In a possible implementation manner, the hidden layer includes: a normal feature extraction block and a target feature extraction block; the normal feature extraction block is used to: extract information for the target object related to the normal feature information of the to-be-processed image; acquire, based on the information for the target object related to the normal feature information, the normal feature information; output, through the output layer, the normal feature information, and output the information for the target object related to the normal feature information to the target feature extraction block.

The target feature extraction block is used to: extract information for the target object related to the target feature information of the to-be-processed image; acquire, based on the information for the target object related to the target feature information and the information for the target object related to the normal feature information, the target feature information; output, through the output layer, the target feature information.

In a possible implementation manner, the target feature extraction block includes: a depth feature extraction block and a tangent feature extraction block. The depth feature extraction block is used to: extract information for the target object related to the depth feature information of the to-be-processed image; acquire, based on the information for the target object related to the depth feature information and the information for the target object related to the normal feature information, the depth feature information; output, through the output layer, the depth feature information.

The tangent feature extraction block is used to: extract information for the target object related to the tangent feature information of the to-be-processed image; acquire, based on the information for the target object related to the tangent feature information and the information for the target object related to the normal feature information, the tangent feature information; output, through the output layer, the tangent feature information.

The image processing apparatus provided in the embodiment of the present disclosure may be used to execute the steps executed by the terminal device in the above method embodiments, the implementation principles and technical effects of them are similar, and details are not repeated herein in the embodiment.

In order to implement the above embodiments, the embodiment of the present disclosure further provides an electronic device.

Figure 9:
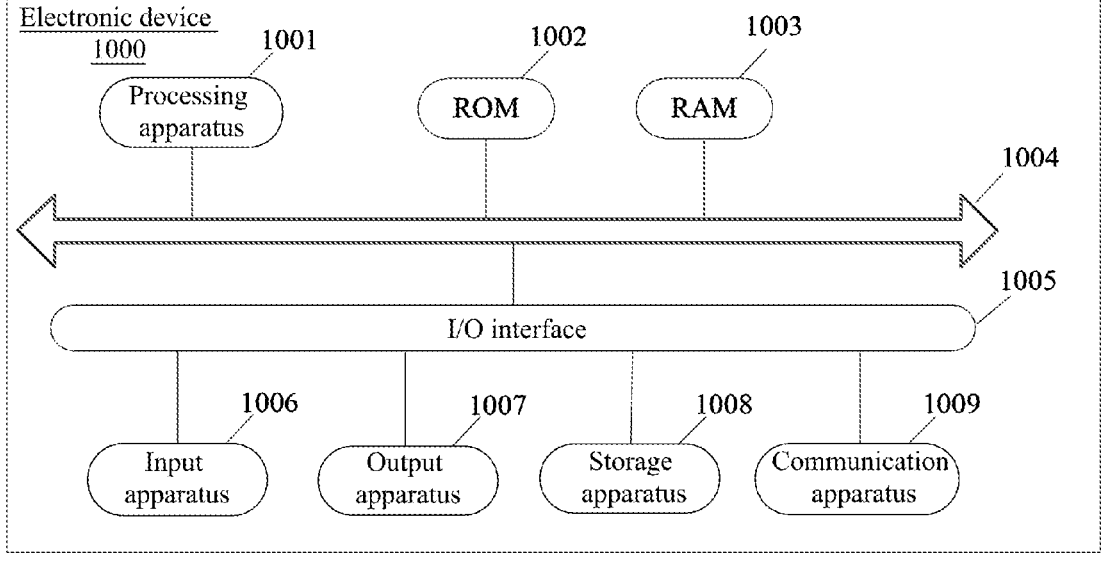
FIG. 9 is a schematic structural diagram of an electronic device provided by an embodiment of the present disclosure.

Referring to FIG. 9, a schematic structural diagram of an electronic device 1000 suitable for implementing an embodiment of the present disclosure is shown. The electronic device shown in FIG. 9 is only an example, and should not bring any limitation on the function and using scope of the embodiments of the present disclosure.

As shown in FIG. 9, the electronic device 1000 may include a processing apparatus (such as a central processing unit, a graphics processor, etc.) 1001, which may perform various appropriate actions and processes based on programs stored in a read only memory (ROM) 1002 or programs loaded from a storage apparatus 1008 into a random access memory (RAM) 1003. In the RAM 1003, various programs and data necessary for operations of the electronic device 1000 are also stored. The processing apparatus 1001, the ROM 1002, and the RAM 1003 are connected to each other through a bus 1004. An input/output (I/O) interface 1005 is also connected to the bus 1004. It should be understood that the processing apparatus 1001 may execute the steps executed by the processing module 901 shown in above FIG. 8.

Generally, the following apparatuses may connect to the I/O interface 1005: an input apparatus 1006, including a touch screen, a touch panel, a keyboard, a mouse, a camera, a microphone, a accelerometer, a gyroscope, and the like; an output apparatus 1007, including a liquid crystal display (LCD), a speaker, a vibrator, and the like; a storage apparatus 1008, including a magnetic tape, a hard disk, and the like; and a communication apparatus 1009. The communication apparatus 1009 may allow the electronic device 1000 to perform wireless or wire communication with other devices to exchange data. Although FIG. 9 shows the electronic device 1000 with multiple kinds of apparatuses, but it should be understood that, it is not required to implement or have all the shown apparatuses. It may alternatively be implemented or provided with more or fewer apparatuses. It should be understood that, the output apparatus 1007 may execute the steps executed by the outputting module 902 shown in the above FIG. 8.

In particular, according to an embodiment of the present disclosure, the process described above with reference to the flowchart may be implemented as a computer software program. For example, an embodiment of the present disclosure includes a computer program product, which includes a computer program carried on a computer readable medium, and the computer program contains a program code for executing the method shown in the flowchart. In such an embodiment, the computer program may be downloaded and installed from the network through the communication apparatus 1009, or installed from the storage apparatus 1008, or installed from the ROM 1002. When the computer program is executed by the processing apparatus 1001, the above-mentioned functions defined in the method of the embodiment of the present disclosure are executed.

It should be noted that, the above-mentioned computer readable medium in the present disclosure may be a computer readable signal medium or a computer readable storage medium or a combination of the both. The computer readable storage medium may be, for example, but not limited to, an electrical, a magnetic, an optical, an electromagnetic, an infrared, or a semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above. In the present disclosure, a computer readable storage medium may be any tangible medium that contains or stores a program, and the program may be used by or in combination with an instruction executive system, apparatus, or device. In the present disclosure, a computer readable signal medium may include a data signal propagated in a baseband or as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable media other than the computer readable storage medium, and the computer readable signal medium may send, propagate, or transmit the program used by or in combination with the instruction executive system, apparatus, or device. The program code contained on the computer readable medium may be transmitted by any suitable medium, including but not limited to: a wire, an optical cable, a radio frequency (RF), etc., or any suitable combination of the above.

The above-mentioned computer readable medium may be included in the above-mentioned electronic device; or it may exist alone without being assembled into the electronic device.

The above-mentioned computer readable medium carries one or more programs, and when the above-mentioned one or more programs are executed by the electronic device, the electronic device is caused to execute the method shown in above embodiments.

The computer program code used to perform operations of the present disclosure may be written in one or more programming languages or a combination thereof. The above-mentioned programming languages include object-oriented programming languages—such as Java, Smalltalk, C++, and also include conventional procedural programming languages—such as "C" language or similar programming languages. The program code may be executed entirely on a computer of a user, partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network—including a local area network (LAN) or a wide area network (WAN), or, it may be connected to an external computer (for example, use an Internet service provider to connect via the Internet).

The flowcharts and block diagrams in the drawings illustrate possible implementation architecture, functions, and operations of the system, method, and computer program product in accordance with the embodiments of the present disclosure. At this point, each block in the flowchart or the block diagram may represent a module, a program segment, or a part of code, and the module, the program segment, or the part of code contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. Where a name of the unit does not constitute a limitation on the unit itself in some cases. For example, the first obtaining unit may also be described as "a unit that acquires at least two Internet Protocol addresses".

The above functions described herein may be performed at least in part by one or more hardware logic components. For example, non-restrictively, exemplary types of hardware logic components that may be used include: a field programmable gate array (FPGA), an application specific integrated circuit (ASIC), an application specific standard part (ASSP), a system on chip (SOC), a complex programmable logic device (CPLD), etc.

In a first aspect, according to one or more embodiments of the present disclosure, an image processing method is provided, including: acquiring a to-be-processed image, where the to-be-processed image includes a target object;

acquiring, by adopting a feature model, normal feature information and target feature information of the target object, where the target feature information includes: depth feature information and/or tangent feature information; performing, based on the normal feature information and the target feature information, a lighting rendering on the target object in the to-be-processed image to obtain a lighting-rendered-image; and outputting the lighting-rendered-image.

According to one or more embodiments of the present disclosure, the feature model is specifically configured to: extract information for the target object related to the normal feature information, and information for the target object related to the target feature information; acquire, based on the information for the target object related to the normal feature information, the normal feature information; acquire, based on the information for the target object related to the normal feature information and the information for the target object related to the target feature information, the target feature information.

According to one or more embodiments of the present disclosure, before the acquiring, by adopting the feature model, the normal feature information and the target feature information of the target object, the method further includes: pre-processing the to-be-processed image to obtain a processed image, where pixel points other than the target object in the processed image have a preset value; where the acquiring, by adopting the feature model, the normal feature information and the target feature information of the target object includes: inputting the processed image into the feature model to obtain the normal feature information and the target feature information.

According to one or more embodiments of the present disclosure, the pre-processing the to-be-processed image to obtain the processed image includes: acquiring, based on the to-be-processed image, a mask image of the target object; adjusting, based on the mask image, the pixel points other than the target object in the to-be-processed image to the preset value; where the inputting the processed image into the feature model includes: concatenating the mask image and the processed image and inputting the concatenated mask image of the sample object and the concatenated processed sample image to the feature model.

According to one or more embodiments of the present disclosure, the performing the lighting rendering on the target object in the to-be-processed image includes: acquiring, according to the normal feature information and the target feature information, a lighting rendering mode; performing the lighting rendering on the target object by adopting the lighting rendering mode.

According to one or more embodiments of the present disclosure, the feature model is trained to obtain by using a sample image, a sample normal feature information of a sample object in the sample image, and a sample target feature information of the sample object as sample data, the sample target feature information includes sample depth feature information and/or sample tangent feature information.

According to one or more embodiments of the present disclosure, the normal feature information is a normal map, the depth feature information is a depth map, the tangent feature information is a tangent map; and the sample normal feature information is a sample normal map, the sample depth feature information is a sample depth map, and the sample tangent feature information is a sample tangent map.

According to one or more embodiments of the present disclosure, the feature model in a training process is an initial feature model, model parameters related to the normal feature information output by the initial feature model in the initial feature model are updated based on a first loss function, and the first loss function is obtained based on the sample normal feature information and the normal feature information output by the initial feature model.

According to one or more embodiments of the present disclosure, the model parameters related to the depth feature information output by the initial feature model in the initial feature model are updated based on a second loss function; where the second loss function is obtained based on the sample depth feature information and the depth feature information output by the initial feature model; and/or, the second loss function is obtained based on the normal feature information obtained from the depth feature information output by the initial feature model, and the sample normal feature information.

According to one or more embodiments of the present disclosure, the model parameters related to the tangent feature information output by the initial feature model in the initial feature model are updated based on a third loss function; where, the third loss function is obtained based on the tangent feature information output by the initial feature model and the normal feature information output by the initial feature model; and/or, the sample data further includes: the sample tangent feature information of a target portion of the sample object and a mask image of the target portion, the target portion has anisotropy, and the third loss function is obtained based on the sample feature information of the target portion, the mask image of the target portion, and the tangent feature information output by the initial feature model.

According to one or more embodiments of the present disclosure, the feature model includes: an input layer, a hidden layer, and an output layer; the input layer is used to input the to-be-processed image to the hidden layer; the hidden layer is used to: acquire, based on the to-be-processed image, the normal feature information and the target feature information; output, through the output layer, the normal feature information and the target feature information.

According to one or more embodiments of the present disclosure, the hidden layer includes: a normal feature extraction block and a target feature extraction block; the normal feature extraction block is used to: extract information for the target object related to the normal feature information of the to-be-processed image; acquire, based on the information for the target object related to the normal feature information, the normal feature information; output, through the output layer, the normal feature information, and output the information for the target object related to the normal feature information to the target feature extraction block.

The target feature extraction block is used to: extract information for the target object related to the target feature information of the to-be-processed image; acquire, based on the information for the target object related to the target feature information and the information for the target object related to the normal feature information, the target feature information; output, through the output layer, the target feature information.

According to one or more embodiments of the present disclosure, the target feature extraction block includes: a depth feature extraction block and a tangent feature extraction block. The depth feature extraction block is used to: extract information for the target object related to the depth feature information of the to-be-processed image; acquire, based on the information for the target object related to the depth feature information and the information for the target object related to the normal feature information, the depth feature information; output, through the output layer, the depth feature information.

The tangent feature extraction block is used to: extract information for the target object related to the tangent feature information of the to-be-processed image; acquire, based on the information for the target object related to the tangent feature information and the information for the target object related to the normal feature information, the tangent feature information; output, through the output layer, the tangent feature information.

In a second aspect, according to one or more embodiments of the present disclosure, an image processing apparatus is provided, including: a processing module, configured to acquire a to-be-processed image, where the to-be-processed image includes a target object; acquire, by adopting a feature model, normal feature information and target feature information of the target object, where the target feature information includes: depth feature information and/or tangent feature information; perform, based on the normal feature information and the target feature information, a lighting rendering on the target object in the to-be-processed image to obtain a lighting-rendered-image;

an outputting module, configured to output the lighting-rendered-image.

According to one or more embodiments of the present disclosure, the feature model is specifically configured to: extract information for the target object related to the normal feature information, and information for the target object related to the target feature information; acquire, based on the information for the target object related to the normal feature information, the normal feature information; acquire, based on the information for the target object related to the normal feature information and the information for the target object related to the target feature information, the target feature information.

According to one or more embodiments of the present disclosure, the processing module is further configured to preprocess the to-be-processed image to obtain a processed image, where pixel points other than the target object in the processed image have a preset value; input the processed image into the feature model to obtain the normal feature information and the target feature information.

According to one or more embodiments of the present disclosure, the processing module is specifically configured to acquire, based on the to-be-processed image, a mask image of the target object; adjust, based on the mask image, the pixel points other than the target object in the to-be-processed image to the preset value; concatenate the mask image and the processed image and input the concatenated mask image of the sample object and the concatenated processed sample image to the feature model.

According to one or more embodiments of the present disclosure, a processing module is specifically acquire, according to the normal feature information and the target feature information, a lighting rendering mode; perform the lighting rendering on the target object by adopting the lighting rendering mode.

According to one or more embodiments of the present disclosure, the feature model is trained to obtain by using a sample image, a sample normal feature information of a sample object in the sample image, and a sample target feature information of the sample object as sample data, the sample target feature information includes sample depth feature information and/or sample tangent feature information.

According to one or more embodiments of the present disclosure, the normal feature information is a normal map, the depth feature information is a depth map, the tangent feature information is a tangent map; and the sample normal feature information is a sample normal map, the sample depth feature information is a sample depth map, and the sample tangent feature information is a sample tangent map.

According to one or more embodiments of the present disclosure, the feature model in a training process is an initial feature model, model parameters related to the normal feature information output by the initial feature model in the initial feature model are updated based on a first loss function, and the first loss function is obtained based on the sample normal feature information and the normal feature information output by the initial feature model.

According to one or more embodiments of the present disclosure, the model parameters related to the depth feature information output by the initial feature model in the initial feature model are updated based on a second loss function; where, the second loss function is obtained based on the sample depth feature information and the depth feature information output by the initial feature model; and/or, the second loss function is obtained based on the normal feature information obtained from the depth feature information output by the initial feature model, and the sample normal feature information.

According to one or more embodiments of the present disclosure, the model parameters related to the tangent feature information output by the initial feature model in the initial feature model are updated based on a third loss function; where, the third loss function is obtained based on the tangent feature information output by the initial feature model and the normal feature information output by the initial feature model; and/or, the sample data further includes: the sample tangent feature information of a target portion of the sample object and a mask image of the target portion, the target portion has anisotropy, and the third loss function is obtained based on the sample feature information of the target portion, the mask image of the target portion, and the tangent feature information output by the initial feature model.

According to one or more embodiments of the present disclosure, the feature model includes: an input layer, a hidden layer, and an output layer; the input layer is used to input the to-be-processed image to the hidden layer; the hidden layer is used to: acquire, based on the to-be-processed image, the normal feature information and the target feature information; output, through the output layer, the normal feature information and the target feature information.

According to one or more embodiments of the present disclosure, the hidden layer includes: a normal feature extraction block and a target feature extraction block; the normal feature extraction block is used to: extract information for the target object related to the normal feature information of the to-be-processed image; acquire, based on the information for the target object related to the normal feature information, the normal feature information; output, through the output layer, the normal feature information, and output the information for the target object related to the normal feature information to the target feature extraction block.

The target feature extraction block is used to: extract information for the target object related to the target feature information of the to-be-processed image; acquire, based on the information for the target object related to the target feature information and the information for the target object related to the normal feature information, the target feature information; output, through the output layer, the target feature information.

According to one or more embodiments of the present disclosure, the target feature extraction block includes: a depth feature extraction block and a tangent feature extraction block. The depth feature extraction block is used to: extract information for the target object related to the depth feature information of the to-be-processed image; acquire, based on the information for the target object related to the depth feature information and the information for the target object related to the normal feature information, the depth feature information; output, through the output layer, the depth feature information.

The tangent feature extraction block is used to: extract information for the target object related to the tangent feature information of the to-be-processed image; acquire, based on the information for the target object related to the tangent feature information and the information for the target object related to the normal feature information, the tangent feature information; output, through the output layer, the tangent feature information.

In a third aspect, according to one or more embodiments of the present disclosure, an electronic device is provided, including: a processor and a memory; the memory stores computer executable instructions; the processor executes the computer executable instructions stored in the memory, enabling the processor to execute the method as described in the above first aspect and various possible designs of the above first aspect.

In a fourth aspect, according to one or more embodiments of the present disclosure, a computer readable storage medium is provided, where computer executable instructions are stored in the computer readable storage medium, and when a processor executes the computer executable instructions, the method as described in the above first aspect and various possible designs of the above first aspect is implemented.

In a fifth aspect, according to one or more embodiments of the present disclosure, a computer program product is provided, including a computer program or an instruction, when the computer program or the instruction is executed by a processor, the method as described in the above first aspect and various possible designs of the above first aspect is implemented.

In a sixth aspect, according to one or more embodiments of the present disclosure, a computer program is provided, when the computer program is executed by a processor, the method as described in the above first aspect and various possible designs of the above first aspect is executed.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in a language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. An image processing method, comprising:
acquiring a to-be-processed image, wherein the to-be-processed image comprises a target object;
acquiring, by adopting a feature model, normal feature information and target feature information of the target object, wherein the target feature information comprises: at least one of depth feature information or tangent feature information;
performing, based on the normal feature information and the target feature information, a lighting rendering on the target object in the to-be-processed image to obtain a lighting-rendered-image;
outputting the lighting-rendered-image.

2. The method according to claim 1, wherein the feature model is configured to:
extract information for the target object related to the normal feature information in, and information for the target object related to the target feature information;
acquire, based on the information for the target object related to the normal feature information, the normal feature information;
acquire, based on the information for the target object related to the normal feature information and the information for the target object related to the target feature information, the target feature information.

3. The method according to claim 1, wherein before the acquiring, by adopting the feature model, the normal feature information and the target feature information of the target object, the method further comprises:
pre-processing the to-be-processed image to obtain a processed image, wherein pixel points other than the target object in the processed image have a preset value;
wherein the acquiring, by adopting the feature model, the normal feature information and the target feature information of the target object comprises:
inputting the processed image into the feature model to obtain the normal feature information and the target feature information.

4. The method according to claim 3, wherein the pre-processing the to-be-processed image to obtain the processed image comprises:
acquiring, based on the to-be-processed image, a mask image of the target object; adjusting, based on the mask image, the pixel points other than the target object in the to-be-processed image to the preset value;
wherein the inputting the processed image into the feature model comprises:
concatenating the mask image and the processed image and inputting the concatenated mask image and the concatenated processed image to the feature model.

5. The method according to claim 1, wherein the performing the lighting rendering on the target object in the to-be-processed image comprises:
acquiring, according to the normal feature information and the target feature information, a lighting rendering mode;
performing the lighting rendering on the target object by adopting the lighting rendering mode.

6. The method according to claim 1, wherein,
the feature model is trained to obtain by using a sample image, a sample normal feature information of a sample object in the sample image, and a sample target feature information of the sample object as sample data, the sample target feature information comprises at least one of sample depth feature information or sample tangent feature information.

7. The method according to claim 6, wherein the normal feature information comprises a normal map, the depth feature information comprises a depth map, the tangent feature information comprises a tangent map; the sample normal feature information comprises a sample normal map, the sample depth feature information comprises a sample depth map, and the sample tangent feature information comprises a sample tangent map.

8. The method according to claim 1, wherein the feature model in a training process is an initial feature model, model parameters related to the normal feature information output by the initial feature model in the initial feature model are updated based on a first loss function, and the first loss function is obtained based on the sample normal feature information and the normal feature information output by the initial feature model.

9. The method according to claim 8, wherein the model parameters related to the depth feature information output by the initial feature model in the initial feature model are updated based on a second loss function;
wherein the second loss function is obtained based on the sample depth feature information and the depth feature information output by the initial feature model; or,
the second loss function is obtained based on the normal feature information obtained from the depth feature information output by the initial feature model and the sample normal feature information.

10. The method according to claim 8, wherein the model parameters related to the tangent feature information output by the initial feature model in the initial feature model are updated based on a third loss function;
wherein the third loss function is obtained based on the tangent feature information output by the initial feature model and the normal feature information output by the initial feature model; or,
the sample data further comprises: the sample tangent feature information of a target portion of the sample object and a mask image of the target portion, the target portion has anisotropy, and the third loss function is obtained based on the sample feature information of the target portion, the mask image of the target portion, and the tangent feature information output by the initial feature model.

11. The method according to claim 1, wherein the feature model comprises: an input layer, a hidden layer, and an output layer;

the input layer is used to input the to-be-processed image to the hidden layer; the hidden layer is used to:

acquire, based on the to-be-processed image, the normal feature information and the target feature information;

output, through the output layer, the normal feature information and the target feature information.

12. The method according to claim 11, wherein the hidden layer comprises: a normal feature extraction block and a target feature extraction block;

the normal feature extraction block is used to:

extract information for the target object related to the normal feature information of the to-be-processed image;

acquire, based on the information for the target object related to the normal feature information, the normal feature information;

output, through the output layer, the normal feature information, and outputting the information for the target object related to the normal feature information to the target feature extraction block;

the target feature extraction block is used to:

extract information for the target object related to the target feature information of the to-be-processed image;

acquire, based on the information for the target object related to the target feature information and the information for the target object related to the normal feature information, the target feature information;

output, through the output layer, the target feature information.

13. The method according to claim 12, wherein the target feature extraction block comprises: a depth feature extraction block and a tangent feature extraction block;

the depth feature extraction block is used to:

extract information for the target object related to the depth feature information of the to-be-processed image;

acquire, based on the information for the target object related to the depth feature information and the information for the target object related to the normal feature information, the depth feature information;

output, through the output layer, the depth feature information;

the tangent feature extraction block is used to:

extract information for the target object related to the tangent feature information of the to-be-processed image;

acquire, based on the information for the target object related to the tangent feature information and the information for the target object related to the normal feature information, the tangent feature information;

output, through the output layer, the tangent feature information.

14. An image processing apparatus, comprising: a processor and a memory;

wherein the memory stores computer executable instructions, the processor executes computer executable instructions stored in the memory, enabling the processor to:

acquire a to-be-processed image, wherein the to-be-processed image comprises a target object; acquire, by adopting a feature model, normal feature information and target feature information of the target object, wherein the target feature information comprises: at least one of depth feature information or tangent feature information; perform, based on the normal feature information and the target feature information, a lighting rendering on the target object in the to-be-processed image to obtain a lighting-rendered-image;

output the lighting-rendered-image.

15. The image processing apparatus according to claim 14, wherein the feature model is specifically used to:

extract information for the target object related to the normal feature information, and information for the target object related to the target feature information;

acquire, based on the information for the target object related to the normal feature information, the normal feature information;

acquire, based on the information for the target object related to the normal feature information and the information for the target object related to the target feature information, the target feature information.

16. The image processing apparatus according to claim 14, wherein the memory stores computer executable instructions, the processor executes computer executable instructions stored in the memory, enabling the processor to:

pre-process the to-be-processed image to obtain a processed image, wherein pixel points other than the target object in the processed image have a preset value;

input the processed image into the feature model to obtain the normal feature information and the target feature information.

17. The image processing apparatus according to claim 16, wherein the memory stores computer executable instructions, the processor executes computer executable instructions stored in the memory, enabling the processor to:

acquire, based on the to-be-processed image, a mask image of the target object; adjust, based on the mask image, the pixel points other than the target object in the to-be-processed image to the preset value;

concatenate the mask image and the processed image and input the concatenated mask image and the concatenated processed image to the feature model.

18. The image processing apparatus according to claim 14, wherein the memory stores computer executable instructions, the processor executes computer executable instructions stored in the memory, enabling the processor to:

acquire, according to the normal feature information and the target feature information, a lighting rendering mode;

perform the lighting rendering on the target object by adopting the lighting rendering mode.

19. The image processing apparatus according to claim 14, wherein, the feature model is trained to obtain by using a sample image, a sample normal feature information of a sample object in the sample image, and a sample target feature information of the sample object as sample data, the sample target feature information comprises at least one of sample depth feature information or sample tangent feature information.

20. A non-transitory computer readable storage medium, wherein computer executable instructions are stored in the computer readable storage medium, and when a processor executes the computer executable instructions, the following steps are implemented:

acquiring a to-be-processed image, wherein the to-be-processed image comprises a target object;

acquiring, by adopting a feature model, normal feature information and target feature information of the target object, wherein the target feature information comprises: at least one of depth feature information or tangent feature information;

performing, based on the normal feature information and the target feature information, a lighting rendering on the target object in the to-be-processed image to obtain a lighting-rendered-image;

outputting the lighting-rendered-image.

\* \* \* \* \*